United States Patent [19]

Stich

[11] 4,456,871

[45] Jun. 26, 1984

[54] POWER SUPPLY FOR ELECTRONIC CONTROL SYSTEM

[75] Inventor: Frederick A. Stich, Milwaukee, Wis.

[73] Assignee: Siemens-Allis, Inc., Atlanta, Ga.

[21] Appl. No.: 365,861

[22] Filed: Apr. 5, 1982

[51] Int. Cl.$^3$ .............................................. G05F 5/00
[52] U.S. Cl. .............................. 323/217; 307/252 N; 323/300; 363/85; 361/94
[58] Field of Search ...................... 307/252 R, 252 N; 323/217, 237, 242, 265, 282, 284, 288, 300, 326, 351; 363/128, 85

[56] References Cited

U.S. PATENT DOCUMENTS

| | | | |
|---|---|---|---|
| 3,259,834 | 7/1966 | Wright | 323/284 |
| 3,305,755 | 2/1967 | Walsh | 307/252 N X |
| 3,601,688 | 8/1971 | Dogadko | 323/300 X |
| 3,663,943 | 5/1972 | Nakajima et al. | 363/85 |
| 4,180,842 | 3/1978 | Keeney | 361/85 |
| 4,219,858 | 12/1978 | DePuy et al. | 361/94 |
| 4,219,860 | 12/1978 | DePuy | 361/94 |
| 4,241,410 | 3/1979 | DePuy | 364/715 |
| 4,291,355 | 6/1979 | Dinger | 361/61 |

FOREIGN PATENT DOCUMENTS

| | | |
|---|---|---|
| 73253 | 6/1979 | Japan ............. 323/265 |
| 2073969 | 10/1981 | United Kingdom . |
| 2073973 | 10/1981 | United Kingdom . |

OTHER PUBLICATIONS

General Electric Lod-Trak, II(TM) Solid State Motor Protection Instructions, pp. 39-40, 46-51 and 58-60, Aug. 1979.

"Programmable AC Motor Protection", Davis et al., Based on a Paper Published in Tappi '78 Engineering Conference Proceedings.

IEEE Transaction Paper, T74029-5, "Thermal Tracking-A Rational Approach to Motor Protection", Boothman et al., Nov. 1973.

Primary Examiner—William M. Shoop
Attorney, Agent, or Firm—John L. James

[57] ABSTRACT

An inexpensive power supply for an electconic control system or the like which is capable of converting a wide range of applied AC voltages into a regulated output voltage. A thyristor is coupled in series with an input terminal and a threshold device, such as a Zener diode, placed across the input terminals and paralleled by an RC circuit coupled to the thyrisor gate. Another capacitor is coupled to the thyristor cathode. A ramp-like voltage impressed on the thyristor gate effects triggering at a phase angle which varies in accordance with output voltage. The electronic control system outputs a uniform train of pulses which serve to disable a circuit interrupter. Termination or disruption of the pulse train causes the interrupter to open the protected circuit.

9 Claims, 6 Drawing Figures

POWER SUPPLY FOR ELECTRONIC CONTROL SYSTEM

RELATED APPLICATIONS

The subject matter described in this application is related to material disclosed in co-filed U.S. Ser. No. 365,378, now U.S. Pat. No. 4,446,498 "Control System for Overload Relay or the Like"—F. Stich; U.S. Ser. No. 365,164, now U.S. Pat. No. 4,423,458 "Signal Processing System for Overload Relay or the Like"—F. Stich; and U.S. Ser. No. 365,554, now U.S. Pat. No. 4,423,459 "Solid State Overload Relay Control and Method"—F. Stich and C. Williams.

BACKGROUND OF THE INVENTION

The present invention relates to a simple and inexpensive power supply, and more particularly to a power supply of the type which automatically varies the firing angle of a thyristor in order to control and output voltage. A further aspect of the invention is the provision of a "watchdog" circuit which operates a circuit interrupter if a train of output pulses is terminated or disrupted.

Circuit protection devices such as circuit breakers, relays, contactors and the like are commonly used for disconnecting electrical circuits upon the detection of undesired currents. In addition to breaking the circuits in which the currents flow, other functions may be provided such as actuating alarms and safety devices, or the control of other apparatus in response to a sensed current characteristic. While in principle the opening of an electrical circuit in response to undesirably high currents is a simple procedure, in practice the operation of such protective devices is highly complex owing to the various, often conflicting requirements of electrical systems.

For instance, while it is necessary to protect electric motors from high currents which could damage or destroy the windings, in order to start a motor under load a high initial current is required. Also, during the operation of various electrical equipment, for instance under changing loads, high current flow must be tolerated for short periods of time. Further a single "threshold" for current flow cannot be assigned since a small overcurrent condition can be tolerated far longer than a high overcurrent condition. For these reasons industrial relays and contactors are commonly provided with complex control mechanisms which make use of two or more different current-responsive stages in an attempt to "tailor" the tripping characteristics of the device to a desired application.

In principle it is known that more sophisticated control systems can be designed to replace the present electromechanical, magnetic, and thermal controls. Most such controls must derive their operating voltage from power lines which carry relatively high voltages. For commercial reasons the devices must be usable with a broad range of voltages, often from 100 to 500 volts. The voltage of the control power supply, however, must remain within a closely-regulated band of the order of 10 volts. At the same time the power supply must be simple, rugged and relatively inexpensive.

Recently efforts have been made to design electronic control systems which make use of digital and other allied signal processing techniques which will provide the desired functional flexibility, and eliminate the need for mechanical adaptations to change the range or operating characteristics of a control. Two examples of such a system are shown in U.S. Pat. Nos. 4,219,858—DePuy et al and 4,219,860—DePuy. These patents disclose an overcurrent relay control which utilizes digital sampling, multiplexing and signal accumulation techniques for detecting overcurrent conditions in one or more phases of a multiphase electrical system.

The nature of the direction exercised over the output device, such as a relay winding, operated by the control system is also a critical factor and, particularly with sophisticated and complex control systems, it is desirable to provide a form of "fail-safe" output control in order to be certain that outputted signals cannot be misread and that improper functioning or anamolous signals in the control system will not result in catastrophic failure. It will therefore be appreciated that it would be highly desirable to provide an improved circuit interrupting control system which supervises interrupter operation in a "fail-safe" manner, and to provide a voltage supply stage which is relatively inexpensive but is capable of accepting applied voltages whose values vary over a wide range.

It is therefore an object of the present invention to provide an improved control operating apparatus for circuit interrupters of the overload relay and contactor type.

Another object is to provide an interrupter control which monitors the status of the interrupter and responds in a "fail safe" mode to control failure.

Another object is to provide an inexpensive solid-state power supply which utilizes elements to convert a broad range of available voltages into a regulated, low-voltage supply.

It is a further object of the invention to provide a low cost phase-angle controlled power supply which automatically converts a wide range of available line voltages into a single, low-level voltage suitable for use with digital control equipment.

SUMMARY OF THE INVENTION

Briefly stated, in accordance with one aspect of the invention the foregoing objects are achieved by providing a power supply incorporating a thyristor in series with a source of high potential, and a gating circuit comprising a Zener diode across the power supply feeding an R-C circuit coupled to the thyristor gate. A capacitor coupled to the thyristor cathod provides a source of output current, and also an output and reference voltage. As the input voltage alternates, each half-wave causes the gate capacitor to charge in a ramp-like fashion. The thyristor is gated on when the gating capacitor voltage exceeds the voltage upon the output capacitor. As output voltage rises the conduction angle of the thyristor becomes lower and lower and conversely, so that the firing angle of the thyristor is caused to vary automatically as an inverse function of output voltage. This maintains the output voltage at a relatively stable level. A digital control system for an overcurrent relay which is energized by the power supply outputs a train of pulses to a keep-alive circuit which maintains the energization of an output relay winding so that the relay contacts maintain a desired position as long as the control system is operational. Failure of the control system, or anomalous operation which results in an irregular pulse train output, results in the disabling of the circuit interrupter.

BRIEF DESCRIPTION OF THE DRAWINGS

While the specification concludes with claims particularly pointing out and distinctly claiming the subject matter which is regarded as the invention, it is believed that the invention will be better understood from the following description of a preferred embodiment taken in conjunction with the accompanying drawings in which:

FIG. 3 represents waveforms at various points in the system of

FIG. 1;

DESCRIPTION OF A PREFERRED EMBODIMENT

Figure 1:
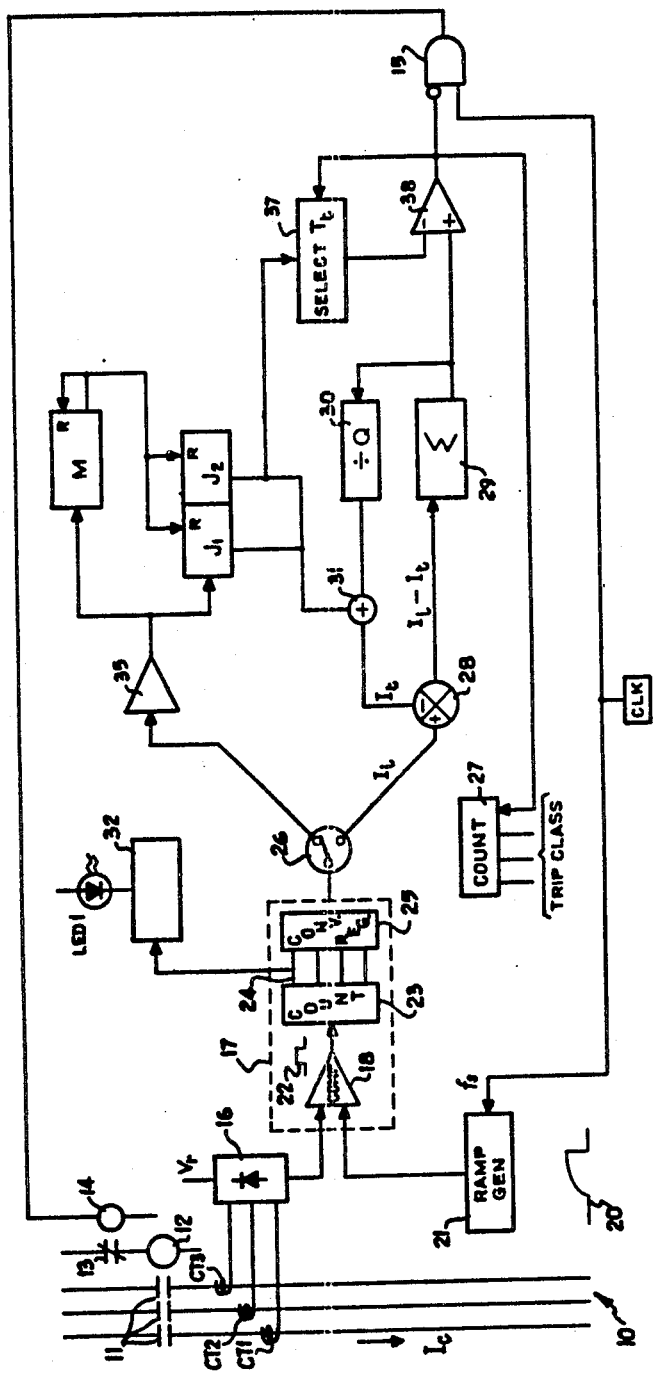
FIG. 1 is a functional schematic diagram illustrating the operation of a system utilizing the present invention.

In the embodiment of the invention which is shown in the functional schematic diagram of FIG. 1, an electric circuit including conductors 10 is protected by means of an interrupting mechanism, here shown as a contactor comprising contacts 11 and an actuating coil 12. Current is applied to the actuating coil by an output relay including contacts 13 and coil 14. Coil 14 is in turn energized by a driver stage 15, herein functionally depicted as AND gate. Alternating load current $I_c$ flowing through the conductors is sensed by current transformers CT1, CT2 and CT3. The signals outputted by the current transformers are processed by a suitable circuit, herein shown as rectifier stage 16, to provide a single rectified AC current signal which is supplied to an analog-to-digital converter 17 which includes a comparator 18. As will be more fully described hereinafter, rectifier stage 16 is connected between a point of reference potential $V_r$ and an input terminal of comparator 18. The polarity of the rectifier stage opposes the reference voltage, and the maximum voltage output of the rectifier stage is substantially the same as the reference voltage so that an inverse relationship is established between the rectifier output and the voltage signal applied to the comparator. The other input of comparator 18 is constituted by a ramp-like waveform 20 which may generally described as a monotonically changing voltage value and which is produced by a ramp generator 21. Signals at a sampling frequency $f_s$ from a pulse generator CLK periodically reset the ramp generator to begin a new sampling cycle. The pulse train also passes through AND gate 15 for maintaining coil 14 in an energizing state.

The change in state of the output of comparator 18, shown herein as a square waveform 22, is applied to a digitizer 23 which may take the form of a 4-bit counter. The counter is caused to output a second, digital signal comprised of pulses on lines 24, the digital signal resolving the value of the level of current in conductors 10 into 16 discrete steps. The digital signal is applied to the inputs of a conversion register 25. The register, which in a preferred embodiment is a read only memory (ROM), serves to transform the four-bit current signal into third, current level signals in response to the applied digital signal. The third signal, denominated $I_i$, has a digital value which is a nonlinear function of the second signals received from counter 23 and may comprise an 8-bit digital word. The digital current signal $I_i$, which in the present nomenclature represents the ith sample of current, is applied to one of two signal paths by means represented as switch 26. A counter 27 outputs control pulses which coincide with, but are at a lower frequency than, the sampling frequency $f_s$. In this manner, depending upon the setting of counter 27 by its "Trip Class" input, every nth current sample signal is directed to the lower signal path; the balance of $n-1$ sample signals are applied to the upper path, as shown. $I_i$ is transmitted to an arithmetic processing stage 28 such as a counter which is supplied with a value corresponding to a desired current threshold $I_t$. The current signal $I_i$ is added algebraically to the threshold value $I_t$ and the difference, which may be positive or negative, is loaded into an accumulator 29 which may be a counter, shift register or similar device.

A digital representation of the current sample is also applied to a decoder 32, which in turn drives an annunciator stage, here shown as LED1. While the digital signal may be derived at various points of the system in a presently preferred embodiment the four-bit signal from counter 23 is used.

Accumulator 29 continually sums the current signals from unit 28. Positive-valued signals, indicating an overcurrent, increase the value of the digital signal stored within accumulator 29 while negative-valued signals, representing current below the threshold value, are subtracted from the accumulated sum. The content of accumulator 29, corresponding to an accumulated digital count, is fed back through a dividing stage 30 where it is divided by a factor Q, and thence to a summing node 31 and used to establish a current threshold value $I_t$. In this manner the net current threshold level will reflect the thermal history of the load device as manifested by current flow and the content of the accumulator will stabilize at an appropriate level in the presence of normal current flow.

When the sensed current level is too great the accumulated value exceeds the accumulator trip threshold, as established at comparator 38, and the accumulator in effect overflows and causes a TRIP signal to be produced. The TRIP signal is applied to AND gate 15 for disabling it and preventing pulses from CLK to be transmittal for energizing coil 14. Contacts 13 then open, deenergizing coil 12 and opening contacts 11. At the same time accumulator 29 is decremented in a manner to be explained hereinafter.

The current signals which are not diverted to the lower, or overcurrent, signal path are applied by switch 26 an arithmetic unit 35 and tested to determine whether they satisfy the inequality $$P I_{i-1} \leq I_i \leq \frac{I}{P} I_{i-1}$$

in order to detect samples which deviate from each previous sample $I_{i-1}$ by more than a given percentage. Signals whose values satisfy both sides of the inequality increment counter M, while those signals which deviate from the preceding ones by more than the desired bandwidth increment counter J. Counter M and each section $J_1$ and $J_2$ of counter J produces an output when it is filled, counter M having a substantially larger content than the J counter. If counter M is filled first, it outputs a signal which resets both itself and all sections of counter J. On the other hand, if a section of counter J is filled before counter M, representing a predetermined incidence of fluctuation in current level, a signal is outputted which changes either or both the current threshold values $I_t$ and trip threshold $T_t$.

It will now be understood that for a relatively high incidence of out-of-tolerance current signals, counter section $J_1$ will be filled before counter M can overflow and output a reset signal. The output of counter stage $J_1$ is added to the fed-back "thermal memory" signal from accumulator 29, causing current threshold $I_t$ to be lowered and increasing the net value $(I_i-I_t)$ which is applied to accumulator 29. This has the effect of causing the current-related signals to be accumulated at a substantially constant rate despite an imbalance between phase currents, or other distortion of the circuit waveforms.

In like manner should the population of out-of-tolerance current signals in a given sample be still greater, indicating a still more unbalanced or even single-phased situation, counter segments $J_1$ and $J_2$ will both be filled before main counter M outputs its reset signal and accordingly, a still larger value will be applied to summing node 31 for decreasing threshold signal $I_t$ still further. This provides further compensation and maintains the rate at which current signals are accumulated for a given level of circuit current flow, and also maintains the point at which the accumulator content will stabilize in the absence of an overcurrent condition. In this manner the system is caused to maintain its sensitivity to overcurrent conditions despite varying degrees of current imbalance.

Figure 2:
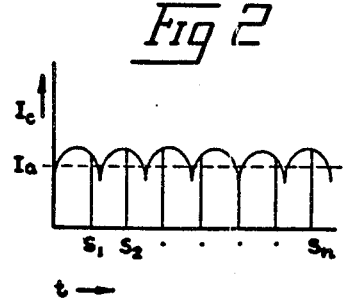
FIG. 2 illustrates a load current waveform.

Although the present invention may be used with single-phase systems, it is anticipated that it will most commonly be used with three-phase current. As is well known by those skilled in the art, half-wave rectified three-phase current exhibits a regular ripple configuration, as shown in FIG. 2. The duration of each of the regular waveforms is substantially 120° of the full cycle of each phase waveform. Although it is easily within the skill of the art to filter the rectified current and reduce the ripple therein in order to provide a practically constant current level which is representative of current flow in the circuit, the present inventor has found that this approach is actually undesirable when used with a sampling system of the type described. In the preferred embodiment a rectifier stage is provided which is of a type which ensures that significant ripple will be present in the rectified waveform. The average current value $I_a$ is indicated on the vertical coordinate of the graph, the horizontal coordinate denoting time. Current $I_c$ is sampled at a rate $f_s$, the sample points being indicated as S1, S2, ... Sn in the figure. For reasons to be more fully explained hereinafter it is important to the proper operation of the invention that sampling occur asynchronously with the alternating current $I_c$, that is, that the sampling frequency $f_s$ not be a harmonic frequency of triple the frequency of the circuit current $I_c$ in any phase. "Harmonic" as used herein should be taken to mean harmonic frequencies which are both above and below 3f.

It will be understood that individual samples do not for the most part produce a signal truly indicative of average current value $I_a$. Moreover, due to the error inherent in any system and particularly due to the fact that only discrete, predetermined current value signals can be outputted by conversion register 25, it will be appreciated that a single sampling of the current such as occurs at time S1 will produce a signal which is only an approximation of actual sampled instantaneous, average, RMS, or other current value which is sought. However, by taking a large number of samples at irregular points on the waveform the errors which occur due to the discrete signal levels in the signal processing system are effectively nulled out, and the accuracy of the system greatly enhanced.

The alternating current $I_c$ flowing in conductors 10 induces similar signals in current transformers CT1, CT2 and CT3 which are applied to rectifier stage 16. The rectifier stage outputs a signal which constitutes an envelope of the half-wave rectified 3 phase currents in conductors 10. Here it should be pointed out the time constant of the ramp-like comparison signal 20 is far less than that of the frequency of the line current being sampled. Referring to waveform $I_c$ of FIG. 3, sampling periods S1-S4 are shown superimposed thereupon. For clarity of explanation these are shown in idealized form and at a lower frequency than actually required, and it will be recognized that the duration of the samples themselves is small with respect to the period of the waveform $I_c$ so that the sampling may be considered almost instantaneous in nature.

The current sensed during a sample period is represented by a digital signal which is a function of current value. By using a nonlinear reference waveform 20 such as an exponential curve a nonlinear relationship is established between the level of sensed current and the digital signals which represent it, and in this manner constant resolution of the sensed current is maintained. Due to the steep slope of the sampling waveform during the initial part of the sampling period a rather small differential in time, or equivalently a small output pulse width, corresponds to a relatively large sampled current. Conversely, lower-valued current samples give rise to longer output signals, whose durations are determined by the latter portion of waveform 20 which has a much lesser slope and therefore small deviations in current value result in disproportionately larger changes in the duration of the resulting COMP pulse. The pulse-generating system is therefore considerably more sensitive to current levels for lower values of sampled current than for higher values.

Figure 3:
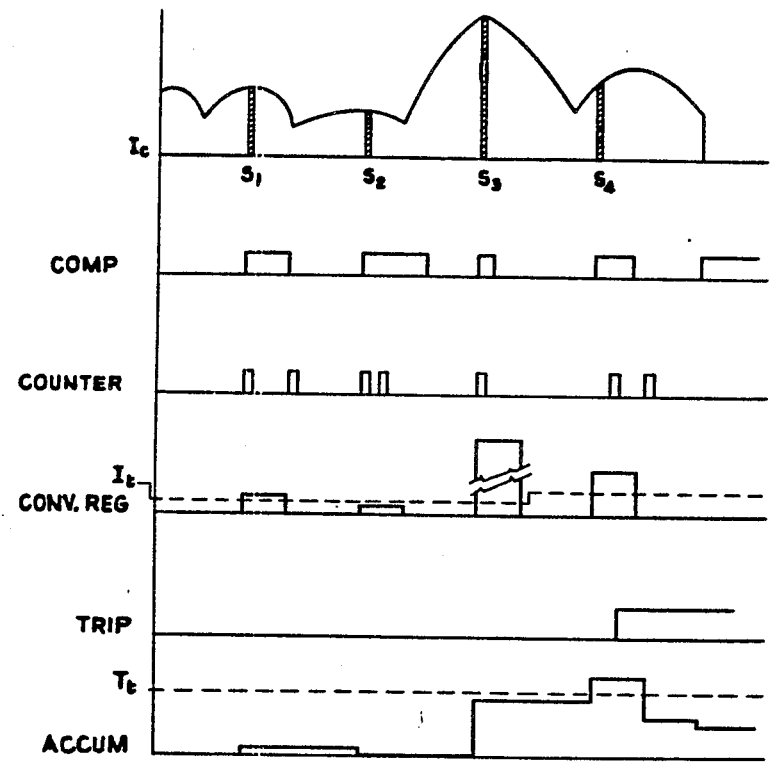

FIG. 3 illustrates how the durations of the pulses outputted by comparator 18 are inversely related to the level of current $I_c$. The durations of the pulses in the Figure is exaggerated for purposes of illustration. It is anticipated that the time duration of the pulses outputted by comparator 18, and indicated at the COMP line of FIG. 3, will be no greater than the duration of the sample time and in most instances somewhat less although when current envelope value remains high the comparator output may be continuously held in its "low" state. The first COMP pulse is somewhat shorter than the second, corresponding to the greater magnitude of the composite waveform during sample S1. For sample S3, however, current $I_c$ has increased substantially; hence the COMP pulse is substantially shorter in duration. At sample S4, current $I_c$ has diminished from the value of sample S3 but is somewhat greater than that of samples S1 or S2. Accordingly, the fourth COMP pulse has a duration less than the first and second pulses. The COUNTER pulses shown on the third line of FIG. 3 occur at substantially the same time as the COMP pulses. It should also be noted that although depicted as serial, COUNTER pulses occur simultaneously on four output lines. The longer the COMP pulse, the higher the numerical value which the COUNTER pulses represent. With the present system, higher numerical values correspond to lower current values, and conversely.

With an economical four-bit counter or microcomputer, however, the maximum number of values which can be represented is 16. Conversion register 25, which may for instance be a read only memory (ROM) or the like, receives the binary COUNTER signal and responds by outputting a value which is assigned to the received four-bit signal. In a preferred embodiment utilizing a programmable microprocessor, conversion register 25 is comprised by a simple look-up table programmed with appropriate values such as these in Table 1.

Returning to FIG. 1, counter 27 flips switch 26 so that every nth sample pulse is directed to the lower or "overcurrent" signal path, including arithmetic unit 28. The value of n depends upon which TRIP CLASS input of counter 27 is enabled. For a higher TRIP CLASS n becomes larger, corresponding to a lower rate of sampling by the overcurrent path, and the time required to trip the circuit increases. The TRIP CLASS inputs may for instance correspond to NEMA classes 10, 20 and 30 which require the device to trip a 600% overcurrent in 10, 20 or 30 seconds respectively. During the intervening n−1 pulses counter 27 causes switch 26 to direct current sample signals to arithmetic unit 35. A threshold value $I_t$ is subtracted from the CONV REG signals produced by the conversion register 25 by arithmetic unit 28 so that the ultimate value outputted to accumulator 29 reflects the difference between each sample value and the threshold. The result, which may be either a positive or a negative quantity, is applied to accumulator 29 whose contents are represented in idealized form at the ACCUM line of FIG. 3. As the accumulator receives each current-related signal from conversion register 25 it stores the signal, adding it algebraically to signals produced during previous sampling periods. In addition the fed-back "thermal memory" signal increases, adding to the current threshold value $I_t$.

TABLE I

| Count | Assigned Value |
|---|---|
| 0 | 255 |
| 1 | 192 |
| 2 | 145 |
| 3 | 109 |
| 4 | 82 |
| 5 | 62 |
| 6 | 47 |
| 7 | 35 |
| 8 | 27 |
| 9 | 20 |
| 10 | 15 |
| 11 | 11 |
| 12 | 9 |
| 13 | 6 |
| 14 | 5 |
| 15 | 4 |

It will be recognized that lower levels of current $I_c$ produce relatively small CONV REG signals and result in small, or negative, increments in the accumulated value ACCUM; while large values of current produce larger CONV REG signals resulting in increases in the accumulated signal such as that which occurs at the time of sample S3. While the ACCUM signal level in accumulator 29 is represented in analog form, it will be recognized that the retention and adding of such signals can be accomplished in various ways. The accumulator could, for instance, be a capacitor which stores charge from supplied signals; or, as in a preferred embodiment, a RAM memory which receives sequential, digital signals in which case the cumulative value of eight-bit word signals is represented by the vertical height of the ACCUM curve.

If the ACCUM signal exceeds a second, trip threshold value $T_t$, a TRIP signal is produced by comparator 37 which causes contacts 11 to open. In practice the original TRIP signal is small in magnitude and must be amplified by one or more amplifying stages. As soon as the TRIP signal effects the opening of contactor 11 current flow ceases. The sampling activity continues, however but since $I_i$ is zero the quantity $(I_i - I_t)$ is negative and accumulator 29 is decremented accordingly. The TRIP signal is fed back to TRIP CLASS counter 27 to effect a decrementing of the accumulator at a desired rate, and is applied to TRIP SELECT unit 37 to reduce the trip threshold $T_t$ to a lower value.

In a presently preferred embodiment the output signal applied to the electromechanical circuit interrupting stage comprises a series of "keep-alive" or "watchdog" pulses. In the simplified schematic diagram of FIG. 1, pulses from CLK are constantly applied to output circuit 15, and serve to maintain the energization of winding 14. A "trip" signal outputted by comparator 38 in effect inactivates circuit 15, so that the CLK pulses are no longer transmitted to the relay. Here it should be noted that the relay shown in idealized form by winding 14 and normally-closed contacts 13 may comprise various combinations of windings and contacts, and control or latching circuits, as are appropriate for the application.

Due to the absence of the "watchdog" output pulses the system contacts cannot reclosed and this condition persists until the accumulator is decremented to a predetermined value. Depending upon how soon the system is reenergized a residual count will exist within the accumulator so that a correspondingly smaller overcurrent signal count is required to trip the system again. This reflects the fact that the protected load has not fully cooled down from its pre-trip operation and therefore cannot tolerate as large and/or prolonged an overcurrent condition as would be the case if the load device were "cold," that is, at ambient temperature.

Figure 4:
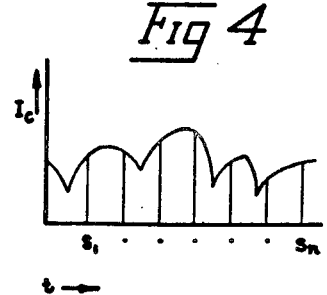
FIG. 4 illustrates a composite current waveform in an unbalanced multiphase circuit.

FIG. 4 represents the composite circuit current envelope when an unbalanced phase condition is present. The overall waveform is distorted, and substantial changes occur from one sampling period to the next. Such substantial changes, occurring in a relatively short time, produce differences between sampled signals sufficient to increment the J counter of FIG. 1 and ultimately cause the value of the current threshold to be lowered in order to compensate for the changed current characteristics. In this manner the illustrated system can detect unbalanced phase conditions, including single phase operation, without the need for separate detection or signal processing equipment and without using differential signal processing by making use of current signals which are already generated within the system.

Figure 5:
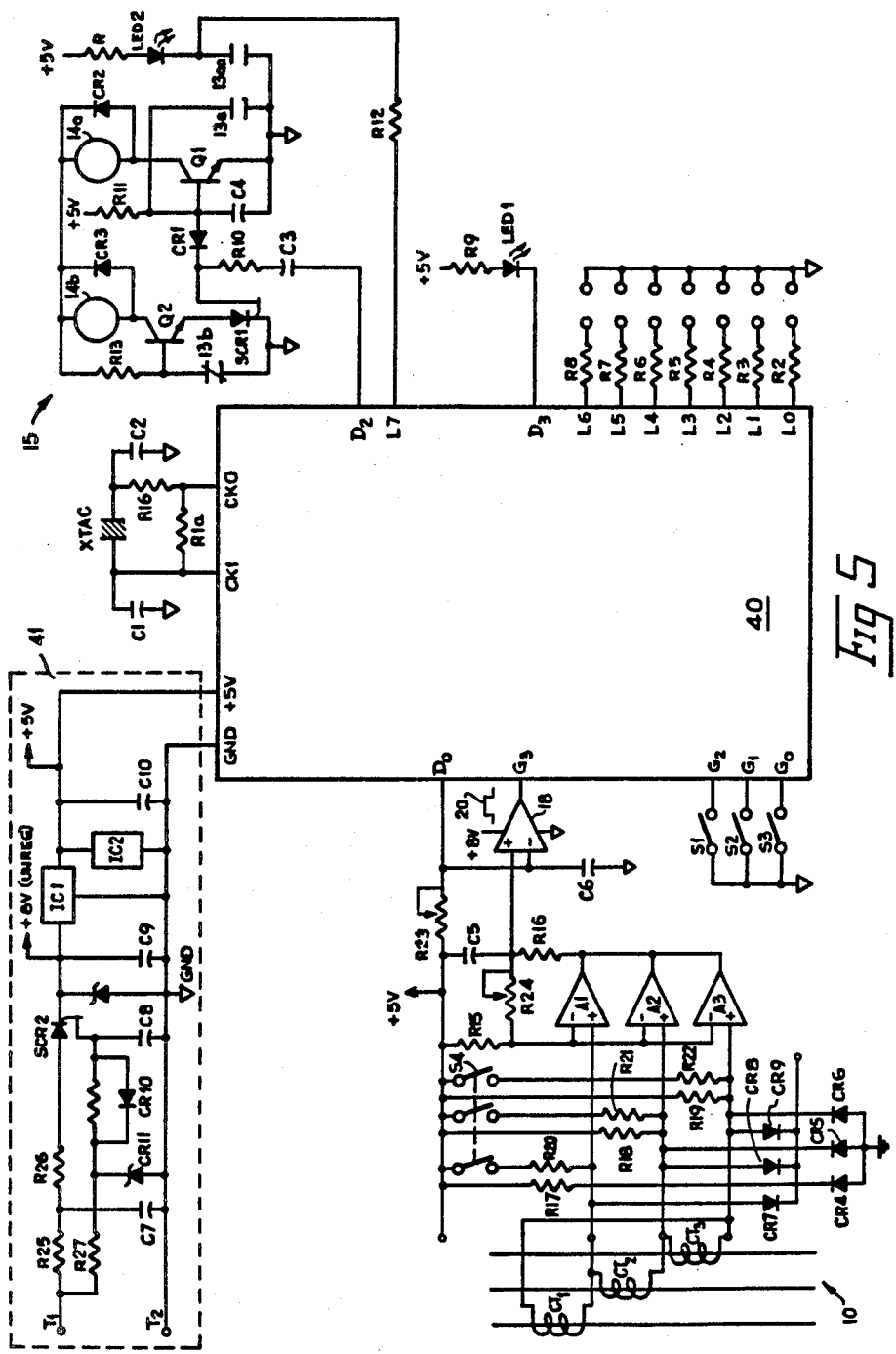
FIG. 5 is a schematic diagram of a presently preferred embodiment of the invention.

FIG. 5 illustrates in further detail a presently-preferred embodiment of the invention in which many of the signal processing functions are carried out by a microcontroller. In a successfully tested embodiment a model COP402 microcontroller, manufactured by the National Semiconductor Corporation of Santa Clara, Calif. was utilized in conjunction with a separate erasable programmable read-only memory although, of course, it is anticipated that as it is produced in large numbers it will utilize a custom read-only memory. The microcontroller, herein designated at 40, utilizes the external oscillator option recommended by the manufacturer including a resonant crystal XTAC and capacitors C1, C2. Resistors R1a and R1b are coupled across the crystal as shown. Resistors R2–R8 are coupled to microcontroller inputs $L_0$–$L_6$, respectively. A power supply circuit 41 providing a source of unregulated 8 volts and regulated 5 volts is coupled between the GND and +5 terminals of the microcontroller. Switches S1, S2 and S3 are coupled between a point of reference potential and programming terminals G1, G2 and G3 for setting the status, or trip class, of the microcontroller. Switches S1–S3 and similar devices coupled to terminals $L_0$–$L_6$ may comprise individual jumpers or other easily manually-operated mechanisms which are accessible to a user of the apparatus for presetting the unit in accordance with field applications of the control, for instance, to allow or to prevent the resetting of the system subsequent to a trip or to tolerate a certain degree of imbalance in order to allow the unit to be used with single-phase current. One of the buffered outputs $D_3$ is coupled to a light emitting diode LED1 for enabling the diode in the presence of an overcurrent condition, when a trip is impending, thereby providing a visible indication of the state of the current monitoring system. As customary, LED1 is connected to a source of potential, here 5 volts, through a resistor R9. A second light emitting diode LED2 is provided for indicating a tripped condition.

The driver circuit indicated at 15 of FIG. 1 is more fully disclosed in FIG. 5, the quiescent or "no trip" output being a pulse train 42 which is AC coupled from terminal $D_2$ by capacitor C3 and a resistor R10 for operating a relay set winding 14a and reset winding 14b. Current for the set winding flows through transistor $Q_1$, whose base is isolated from "no-trip" pulse train 42 by diode $CR_1$. The base is coupled to a source of reference potential through capacitor C4 and to a source of bias potential through resistor R11. A clamp diode $CR_2$ is coupled in shunt about winding 14a. A further set of contacts 13 (FIG. 1) are also operated by winding 14a. The normally-open contacts 13a and 13aa are coupled so that contacts 13a shunt capacitor C4, and contacts 13aa lie between a light emitting diode LED2 and ground. The cathode of LED2 is further coupled to terminal $D_5$ of the microprocessor by resistor $R_{12}$, providing a feedback path for indicating the state of the relay to microprocessor 40.

The reset winding 14b has another diode $CR_3$ coupled about it, and lies in series with second transistor $Q_2$. A gated device such as thyristor $SCR_1$ couples the emitter terminal of $Q_2$ to a point of reference potential while normally closed contacts 13b lie in series with a resistor R13.

In operation, when the system is monitoring normal current flow a train of "watchdog" pulses 42 is constantly produced at terminal $D_2$. The pulse train biases $SCR_1$ into conduction so that reset winding 14b is energized, causing contacts 13b to be closed. Diode $CR_1$ conducts the negative-going edges of pulse train 42, discharging capacitor C4 and maintaining the base terminal of transistor $Q_1$ at a low voltage level. This ensures that $Q_1$ will not be biased on by the 5 volt supply connected through resistor R11. When a TRIP signal occurs, pulse train 42 stops and the gate signal is removed from $SCR_1$. At the same time capacitor C4 charges, enabling transistor $Q_1$ and energizing winding 14a. This causes contacts 13 to open cutting off current flow through winding 12 and opening contacts 11. At the same time contacts 13aa are closed to complete a circuit through LED2, which lights to indicate a "tripped" condition and a ground or zero voltage is applied to input terminal $D_5$, informing the microprocessor that a "tripped" condition exists.

The values for resistor R10 and capacitor C3 are selected to form an RC circuit whose time constant is appropriate for maintaining an adequate gating voltage on the gate terminal of $SCR_1$, and for maintaining capacitor C4 in a relatively discharged state. By tuning the RC circuit to the periodicity of the pulsetrain, control circuit 15 can be made responsive to a pulse train of a particular frequency, and to improper fluctuations by the pulse train. This characteristic provides a safety feature in the event that microprocessor 40 malfunctions in such a manner as to output irregular pulses to the control circuit or if the voltage level of the pulses drops to an unacceptably low level, indicating an abnormally low voltage level within the control which could, in turn, lead to signal processing errors.

In the foregoing manner it will be understood that TRIP signal outputted by FIG. 5 is in actuality the absence of a pulsetrain having predetermined characteristics with regard to amplitude, frequency, and to some degree, pulse configuration. By requiring that the control output a particular form of signal in order to maintain the circuit-protecting interrupter in its closed condition, the output circuit thus provides a fail safe function and enhances the integrity of the overall circuit protection system.

The power supply for systems of the present type is of particular interest, as it presents a substantial design challenge due to the fact that devices such as the industrial overload relay illustrated should be adaptable for use with AC power of from 100 to 500 volts and for frequencies of both 50 and 60 Hz, while producing a constant low-voltage regulated output. At the same time, due to the relatively low price of such devices the cost of the power supply must be low, ruling out complex regulation systems of conventional design. The present inventor has resolved these problems by utilizing a phase-angle controlled thyristor arrangement, without the need for complex firing and commutation circuits or elaborate gate-timing systems.

Referring again to FIG. 5, a pair of input terminals $T_1$ and $T_2$ are provided, across which an AC voltage from 100 to 500 volts may be impressed. An RC filter circuit comprising resistors $R_{25}$ and $R_{26}$ in series, with capacitor $C_7$ coupled between the intersection of the resistor and terminal $T_2$. The series combination of resistors $R_{27}$, $R_{28}$ and capacitor $C_8$ are also connected across the input terminals, with diode $CR_{10}$ coupled in shunt about resistor $R_{28}$ and a Zener diode $CR_{11}$ connected between the intersection of resistors $R_{27}$ and $R_{28}$ and terminal $T_2$. The intersection of capacitor $C_8$ and resistor $R_{28}$ is coupled to the gate terminal of thyristor $SCR_2$ while the anode of the thyristor is coupled to terminal $T_1$ through resistors $R_{25}$ and $R_{26}$.

A second Zener diode $CR_{12}$ extends between the cathode of $SCR_2$ and terminal $T_2$, in parallel with capacitor $C_9$. An ordinary low-voltage transistorized voltage regulator $IC_1$, which may be a conventional integrated circuit regulator for transforming a regulated level of approximately 8 volts to a closely-regulated 5 volt output, is coupled to the output of the circuit as shown and a shunt regulator LC2 connected across the power supply output in order to protect LC1 from fed-back overvoltages which may arise on the 5 volt bus. Capacitor C10 is placed in parallel with LC2 to provide a filtering action.

Figure 6C:
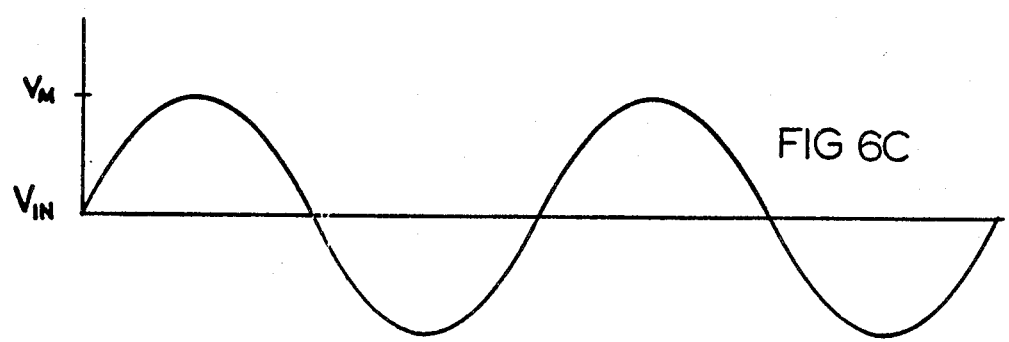
FIG. 6 illustrates voltage waveforms at various points within the power supply circuit.
Figure 6B:
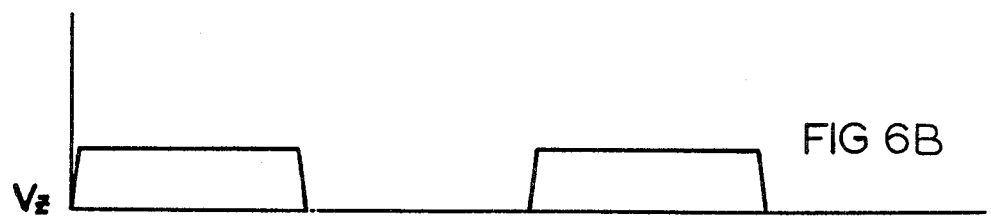
Figure 6A:
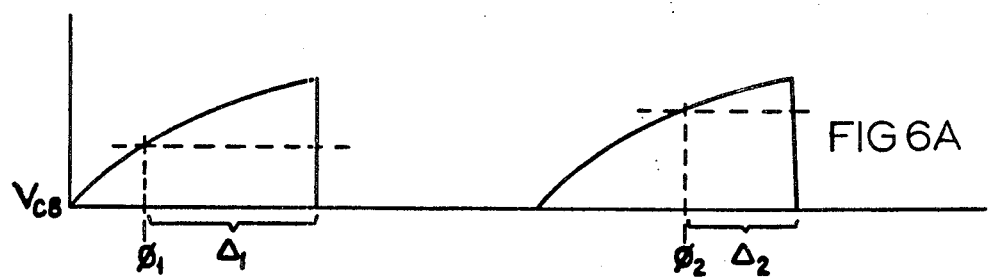

An example of an AC input voltage is shown at a line $V_{in}$ of FIG. 6. The maximum value $V_m$ of the waveform may vary considerably, and it is intended that the present power source be usable over a range of supply voltages of from 100 to 500 volts, and for both 50 and 60 Hz supplies, in order to accommodate the various supply voltages which are utilized in diverse geographical areas and applications. Voltage $V_{1n}$ is impressed across the series combination of resistor $R_{25}$ and capacitor $C_7$, thereby applying a filtered AC waveform to the anode of $SCR_2$. At the same time, the waveform is impressed across the series combination of resistor $R_{27}$ and Zener diode $CR_{11}$.

The voltage across $CR_{11}$ is shown at line $V_z$ of FIG. 6. It will be understood that the voltage scale for line $V_z$ has been expanded considerably, owing to the fact that the threshold voltage of the diode is considerably less than maximum voltage $V_m$, and is commonly on the order of approximately 22 volts. Owing to the well-known characteristics of Zener diodes, the voltage thereacross remains substantially constant during the positive-going half cycles of the supply voltage.

During positive-going half cycles of the supply voltage current flows through resistor $R_{28}$ to the upper plate of capacitor $C_8$, charging the capacitor. The capacitor voltage, illustrated at line $V_{c8}$ of FIG. 6, exhibits a typical ramp-like characteristic, whose time constant is dependent upon the values of the R–C circuit formed by resistor $R_{28}$ and capacitor $C_8$. As charging current flows through resistor $R_{28}$ voltage across capacitor $C_8$, and therefore the voltage on the gate of $SCR_2$, builds up gradually in a ramp- or exponential-like fashion.

In order to gate $SCR_2$ on, the voltage at the gate terminal thereof must be sufficiently greater than the voltage at the cathode to allow the necessary gating current to flow. Therefore, although the gating operation is actually based upon current, for purposes of the present explanation voltage levels will be referred to.

The gating voltage necessary to cause $SCR_2$ to fire is then a function of the voltage across capacitor $C_9$, which serves as filter and current source for the power supply. When the circuit commences operation the voltage across capacitor $C_9$ is relatively small, and a relatively low gating voltage is required to cause $SCR_2$ to conduct. This relatively low voltage is achieved early in the cycle, before the ramp-like voltage upon capacitor $C_8$ has built up to a great degree. This relatively early firing point is designated at $\phi_1$ at line $V_{c8}$. Once gated on, the SCR continues to conduct for the balance of the positive-going waveform, that is, up to 180°. The on-time of the SCR is then represented by the period $\Delta_1$. As the source voltage $V_{in}$ reverses direction and the voltage on the cathode of Zener diode $CR_{11}$ goes to zero diode $CR_{10}$ becomes foreward biased and discharges capacitor $C_8$, terminating the ramp-like gating waveform and allowing $SCR_2$ to be commutated by the voltage reversal.

Current which flows during the time interval $\Delta_1$ charges capacitor $C_9$, thereby providing a voltage level to the 8v bus and to transistorized voltage regulator VREG, which in turn maintains a consistent, 5 volt regulated output. The Zener diode $CR_{12}$ keeps the voltage on capacitor $C_9$ from exceeding the desired limit, particularly under startup conditions when the lack of initial voltage on capacitor $C_9$ may cause a voltage surge to occur.

As the voltage upon the capacitor builds up toward the desired 8 volts, a longer time is required before capacitor $C_8$ is charged to the necessary gating voltage. As shown by the second waveform on line $V_{C8}$ the required, higher gating voltage is not attained until time $\phi_2$, with the result that commensurately shorter conduction time $\Delta_2$ is provided during which charging current can flow through $SCR_2$ to capacitor $C_9$. This feedback effect automatically self-limits the charging of capacitor $C_9$, so that a relatively constant voltage is maintained.

It will now be appreciated that, depending upon the load and therefore the rate at which current is drained from capacitor $C_9$ the firing point $\phi$ of $SCR_2$ will automatically vary, resulting in a greater or lesser conduction time for $SCR_2$ and therefore a greater or lesser charging time for capacitor $C_9$. In this manner a predetermined voltage level is automatically maintained upon capacitor $C_9$ without the necessity for complex gating or control apparatus.

In order to obtain a precisely-regulated 5 volt power supply for the control system, a 2-element final voltage regulator is used. A series regulator, designated $IC_1$, regulates the voltage supplied by capacitor $C_9$ to the 5 volt bus. In a presently preferred embodiment $IC_1$ comprises a standard 3-terminal positive voltage series regulator identified in the industry as No. 7805. Type 7805 regulators are available from many sources, any of which is deemed to be adequate for present purposes. As is commonly known, while such devices produce a well regulated 5 volt output they require at least a moderately well regulated input on the order of 8 volts. In practice, it has been found that the 8 volt output arising across capacitor $C_9$ is maintained in the range of approximately 7 to 11 volts over an input variation of 100 to 500 volts at terminals $T_1$–$T_2$. In addition, a second, shunt regulator $IC_2$ is provided in order to accommodate high voltage surges which may be applied to the 5 volt bus from current transformers $CT_1$–$CT_3$. Such a shunt regulator is simply required to conduct current from the 5 volt bus to ground, or reference, potential in order to keep the bus voltage from exceeding a predetermined limit, advantageously in the range of 5.25 volts. While various transistor regulators may be used a simple breakdown device, such as a precision Zener diode, may be utilized with the principle requirement being the prevention of an inordinately high voltage surge upon the 5 volt bus.

While the accuracy of regulation will be determined in part by the specific component values, in a successfully tested embodiment, Zener diode $CR_{11}$ exhibited a breakdown voltage in the range of 20 volts, while Zener diode $CR_{12}$ had a breakdown voltage of about 13 volts.

It will now be recognized that the present invention comprises an economical yet accurate voltage regulator which is adaptable for use over a broad range of input voltages, and which exhibits a self-limiting function without the need for special sensing or timing circuits. While the system is illustrated for use in combination with an industrial relay, it is anticipated that it will find application in many other systems in which reliable voltage regulation is required at low cost.

It will be readily appreciated by those skilled in the art that many of the elements shown in discrete form in FIG. 5 could easily be provided by one or more integrated circuits, and for those applications in which the described system is produced in quantity it is anticiated that many amplifiers, transistors and resistors can be incorporated in a single custom integrated circuit. Such embodiments of the system are deemed to be well within the skill and discretion of circuit designers.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A power supply for an electronic control system or the like and adapted to be applied to widely varying sources of alternating voltage, and to output a regulated control voltage which is substantially invariant, comprising:

an input terminal for receiving said alternating voltage;

a series combination of a first resistance means and a voltage threshold means coupled between said first terminal and a point of reference potential:

a series combination of a second resistance means and a first capacitor connected in series between the intersection of said first resistance means and said voltage threshold means, and said point of reference potential;

a thyristor having a pair of main terminals coupled to the anode and cathode thereof and having a gate electrode, said gate electrode being coupled to the intersection of said second resistance means and said first capacitor, one of said main terminals being coupled to said input terminal; and a second capacitor coupled between the other of said main terminals and said point of reference potential, whereby the application of said alternating voltage to said input terminal effects a regulated voltage $V_r$ across said second capacitor, and the periodic duration of conduction of said thyristor varies inversely with the value of voltage $V_r$.

2. The invention defined in claim 1, further including a filter means comprising a third resistance means coupled in series between said input terminal and said one of said main terminals, and a third capacitor coupled between said resistance means and said point of reference potential.

3. The invention defined in claim 2, further including a second voltage threshold means coupled in parallel with said second capacitor.

4. a power supply for an electronic control system or the like and adapted to be applied to widely varying sources of alternating voltage, and to output a regulated control voltage which is substantially invariant, comprising:

an input terminal for receiving said alternating voltage;

a series combination of a first resistance means and a voltage threshold means coupled between said first terminal and a point of reference potential;

a series combination of a second resistance means and a first capacitor connected in series between the intersection of said first resistance means and said voltage threshold means, and said point of reference potential;

a thyristor having a pair of main terminals coupled to the anode and cathode thereof and having a gate electrode, said gate electrode being coupled to the intersection of said second resistance means and said first capacitor, one of said main terminals being coupled to said input terminal;

a second capacitor coupled between the other of said main terminals and said point of reference potential, whereby the application of said alternating voltage to said input terminal effects a regulated voltage $V_r$ across said second capacitor, and the periodic duration of conduction of said thryristor varies inversely with the value of voltage $V_r$; and a diode coupled in parallel with said second resistance means and poled to allow said second capacitor to discharge through said first said resistance means.

5. The invention defined in claim 4, wherein said first and second voltage threshold means comprise Zener diodes.

6. The invention defined in claim 5, wherein said thyristor is an SCR.

7. An improved phase-control power supply, comprising an SCR with a pair of main terminals coupled to the anode and cathode thereof, and a gate electrode;

the series combination of a first resistor and a constant voltage threshold device coupled between one of said main terminals and a point of reference potential;

a capacitor connected in series between said gate electrode and a point of reference potential;

a second resistor coupling the intersection of said first resistor and said voltage threshold device with the intersection of said capacitor and said gate electrode;

a unidirectionally-conducting means coupled in parallel with second resistor; and a second capacitor coupled between the other of said main terminals and a point of reference potential, whereby a substantially constant voltage is maintained upon said second capacitor in the presence of input voltages of substantially different values.

8. The invention defined in claim 7, further including filtering means coupled between said one of said main terminals and a point of reference potential for filtering the alternating voltage applied to said thyristor.

9. The invention defined in claim 8, further including a voltage limiting means coupled between the other of said main terminals and said point of reference potential.

* * * * *